No. 861,116. PATENTED JULY 23, 1907.
J. HEDDON.
FISH BAIT OR LURE.
APPLICATION FILED FEB. 4, 1907.
3 SHEETS—SHEET 1.
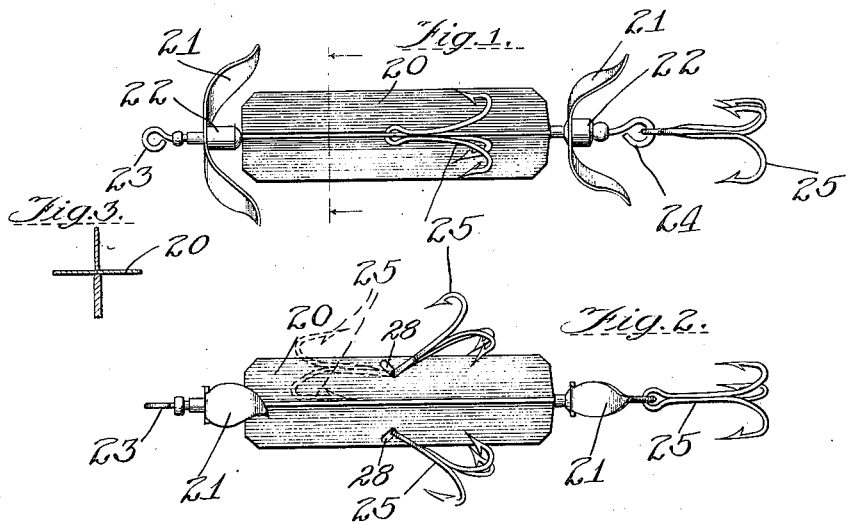
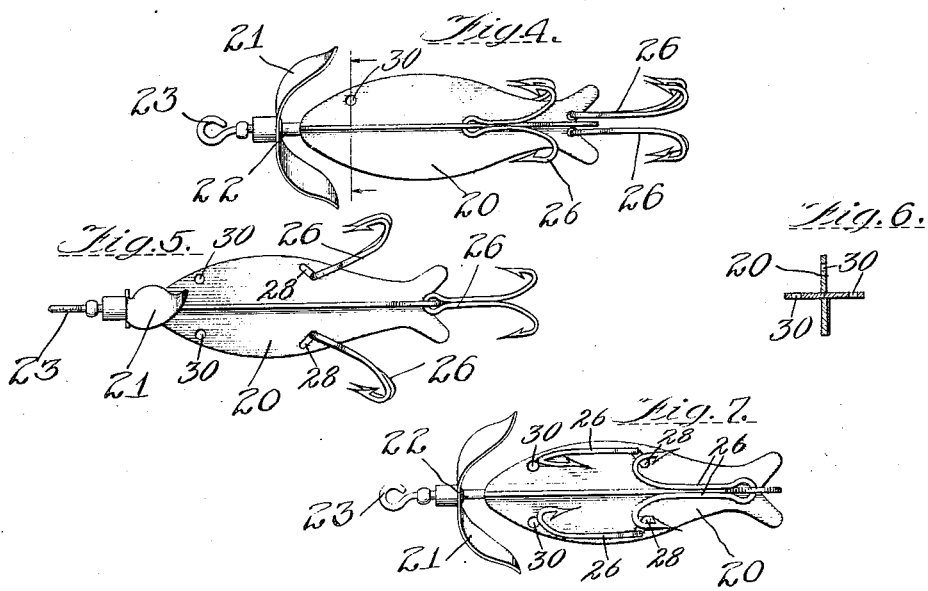
Witnesses:
Ira F. Perry
W. Perry Hahn
Inventor:
James Heddon
By Jones, Addington & Ames
Attys

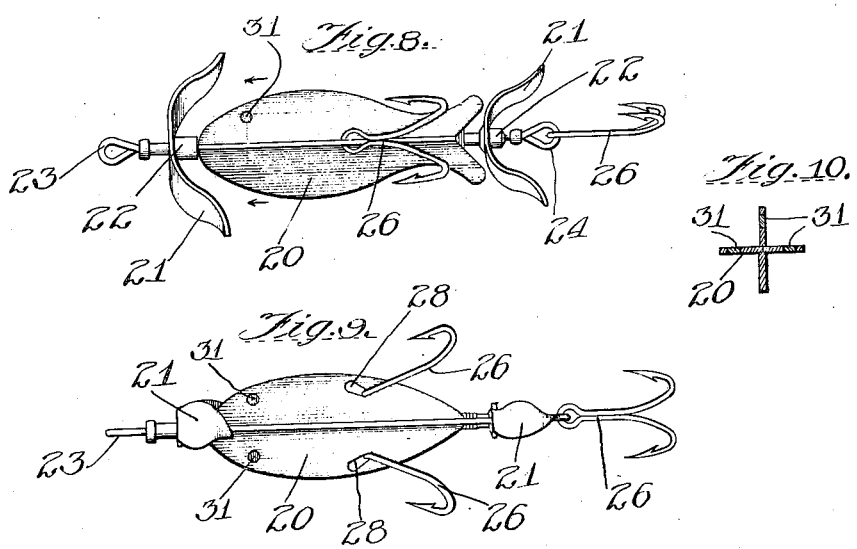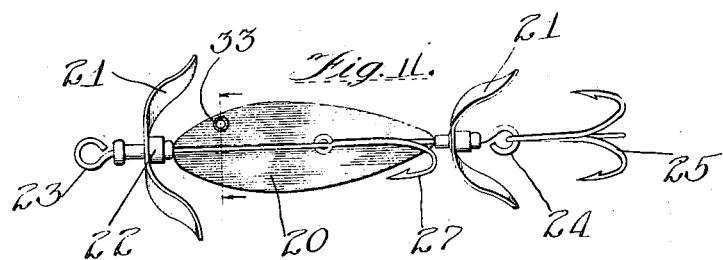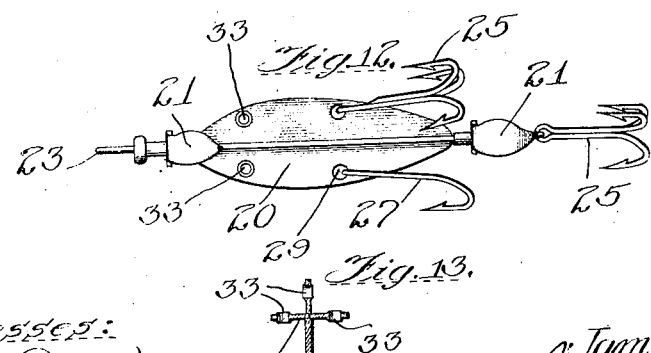

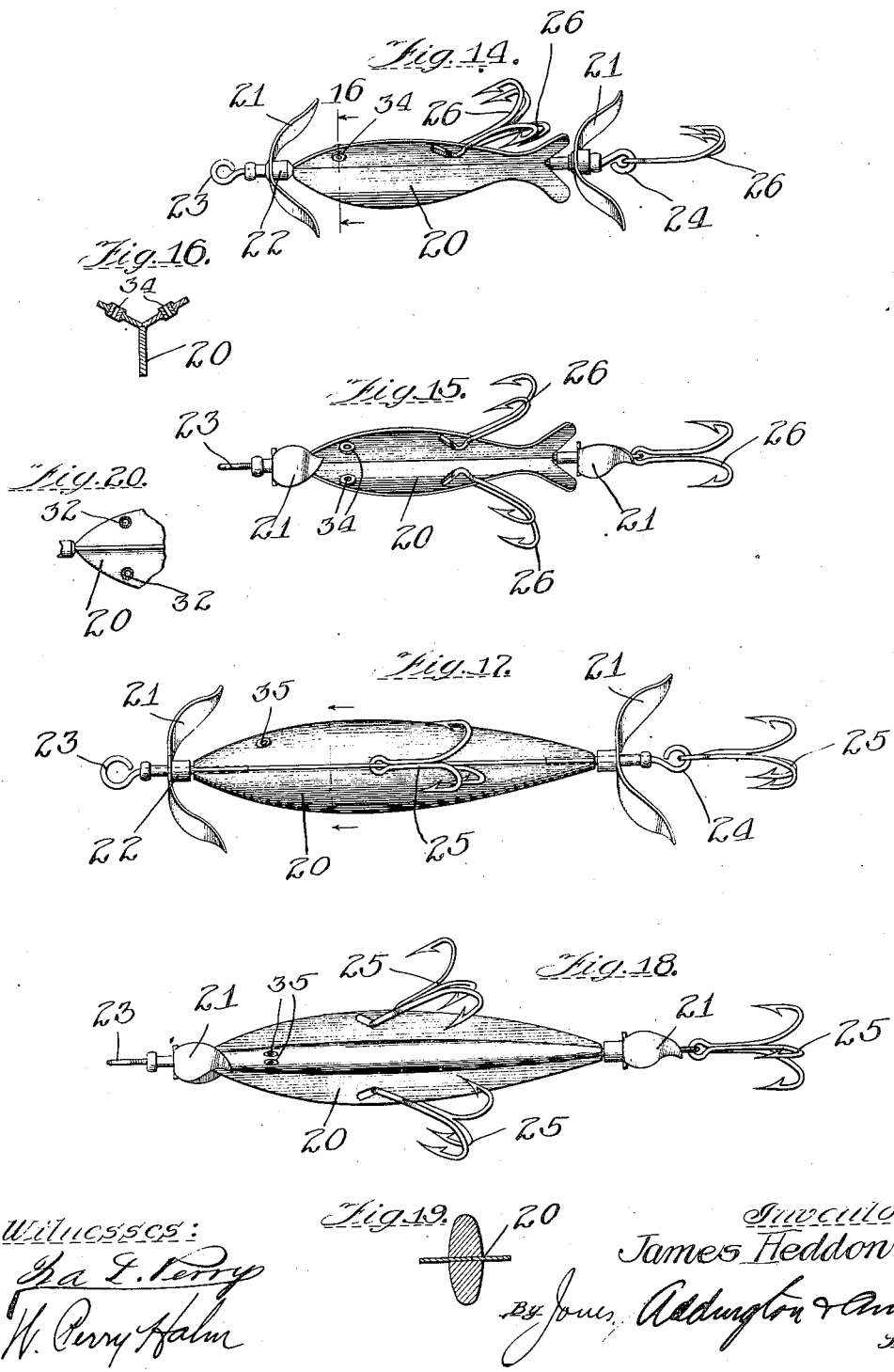

UNITED STATES PATENT OFFICE.

JAMES HEDDON, OF DOWAGIAC, MICHIGAN.

FISH BAIT OR LURE.

No. 861,116.　　　　　Specification of Letters Patent.　　　Patented July 23, 1907.

Application filed February 4, 1907. Serial No. 355,675.

*To all whom it may concern:*

Be it known that I, JAMES HEDDON, a citizen of the United States, residing at Dowagiac, in the county of Cass and State of Michigan, have invented new and useful Improvements in Fish Baits or Lures, of which the following is a full, clear, concise, and exact description, reference being had to the accompanying drawing, forming a part of this specification.

My invention relates to improvements in fish baits or lures, my object being to provide a bait or lure for casting or trolling for fish which shall be effective in attracting and hooking the fish, and which at the same time shall be light, strong and conveniently manipulated and easily drawn through the water.

The accompanying drawings illustrate my invention in various forms, the same reference characters being used to designate like parts throughout the several views, in which:

Figures 1, 2 and 3 are respectively elevational, plan and body cross sectional views of one form of my improved bait or lure; Figs. 4, 5 and 6 are similar views of a slightly different form; Fig. 7 is a plan view of the same bait or lure as in the last three figures showing the hooks turned forwardly to convert the same into a weedless bait or lure; Figs. 8, 9 and 10 are likewise elevational plan and body sectional views of a somewhat modified form of the invention; Figs. 11, 12, and 13 are like views of substantially the same device, but differing in details; Figs. 14, 15 and 16 are similar views of still another arrangement of the bait or lure; Figs. 17, 18 and 19 are similar views of a different modification of the invention; and, Fig. 20 is a side view of the forward part of the body portion of the bait showing a modified way of making the eye.

To make a lure of comparatively large size and which shall be of light weight and easily drawn through the water, I prefer to construct the body portion 20 of a plurality of elongated or longitudinal radially disposed blades or blades lying in intersecting planes attached together in any desired manner, as by soldering, riveting, or other way, or the whole may be molded or cast in one or more pieces. If made from sheet material two blades may be cut or stamped in one piece and bent at right angles or at any desired angle, and two or more of these bent pairs then secured together in any suitable way. The blades are preferably of metal and may be of any desired form, as for instance in Figs. 1 and 2 where they are shown substantially rectangular, but as illustrated in the remaining figures they may be in general of the outline of a fish, thus conforming to the usual preference of anglers. The number of the blades may be varied as desired, four being shown in all the figures except Figs. 14 and 16, where three only are shown, and any angular disposition of them may be made, the greatest reflection of light, however—so attractive to game fish—resulting from the number and arrangement shown in the drawings. While passing through the water, the full size of the exterior dimensions of the body of the bait is observable to the fish f m any direction from which the bait may be seen. ..oreover, a body of this open construction offers least interference to the hooking of the fish. By this construction of the body comparatively slight resistance is encountered in drawing the bait through the water and it therefore may be made larger than is ordinarily possible and its attractiveness correspondingly increased, for it is found that large baits rather than being objectionable to the fish, are more attractive, even to the smaller fish; but as usually constructed their weight and water resistance are such as to have prevented the general adoption of large baits. These blades of which the body is composed are preferably made of highly polished sheet metal of various colors, though any suitable or desired material may be employed. They may be made partly of metal and partly of wood or other material.

As shown in Figs. 17, 18 and 19 the body portion is provided with part metallic blades and part blades of wood; thus, the horizontal blades in this form are constructed of sheet metal while the vertical blades consist of narrow strips of wood secured to the heavy blades by riveting or in any desired manner.

Other arrangements and dispositions of the blades and other combinations of materials may be employed, but I prefer those shown in the drawings. To keep the bait or lure from turning over when being drawn through the water, I preferably construct one or more of the numerous blades of which the body is composed of thicker or heavier material as indicated in Figs. 3, 6, 10, 13, etc., or make it larger than the others, although I do not limit myself in all cases to either of these ways of accomplishing the desired object.

Revolving spinners, as for instance, spinners 21 may be used upon either or both ends of the lure, and will add to the conspicuousness of the same by agitating the water as it is drawn along, although they may be entirely omitted at the option of the angler. These spinners are of ordinary construction and are provided with suitable bearing sleeves as 22, revolving upon the shank or stem of the ring 23 secured as by soldering or any other desired manner to the forward end of the body portion of the bait or lure, and to which ring the line may be secured. In case the spinner is used at the opposite end of the bait, it is similarly mounted upon the stem or shank of the ring 24 secured in like manner to the rear end of the body 20 and to which the rear hook is secured.

The hooks are preferably secured to the side blades of the body of the bait and to the rear end. They may be of any desired kind and have single, double, treble or other points. The hooks 25 of Figs. 1, 2, etc, are of the treble variety, while the hooks 26 of Figs. 4, 5, etc, are of the double point. In Figs. 11 and 12 a treble hook 25 is attached to one blade and to the rear, while a single hook 27 is attached to the opposite blade. In connection with these hooks, it is desirable that they be arranged to be quickly attached and detached, and when the bait is drawn through the water that their points and barbs be held well out from the blades, so that the body may not interfere with the hooking of the fish or the hooks scratch and mar the surface of the body or adjacent hooks become entangled. The attachment of the hook to the blades should also be such as to prevent the wabbling of the hooks as much as possible. In order to accomplish these results the hooks are preferably of the open-shank variety as indicated in the various figures of the drawings and the aperture in the blades through which the ring of the hook passes is preferably in the form of a slot, which slot has a portion adjacent to the outer edge of the blade, thus permitting the open-shank hook to pass over the narrow strip of metal in being attached and detached, which it will easily do. The slot is so extended into the blade that when the eye or ring of the hook is in this position of the aperture or opening a considerable width of the metal will be between the ring of the hook and the adjacent outer edge of the blade, the said edge also forming a support for the hook to hold it out away from the body and presented in the most effective manner. The slot or aperture through which the ring of the hook passes being narrow or about the diameter of the wire of which the hook is made and a considerable width of metal intervening, also tends to prevent the wabbling and undesired displacement of the hook, while the fact that the slot is longer than the diameter of the wire of the hook-ring or eye permits the barb of the hook to be readily passed therethrough. This slot 28 may be arranged at an angle as shown, to the axis of the bait with its forward end nearer the outer edge of the blade, so that when the bait is used the pressure of the water will draw the ring of the hook backwardly to the inner end of the slot, where the hook is held in the advantageous position above described.

While I prefer the slot attachment as above described, other means for attachment may be employed. For instance, in Fig. 12 the hook is shown attached to the blade by means of a round aperture 29, which is necessarily large enough to permit the passage of the barb of the hook and perforce located adjacent to the outer edge of the blade to permit the open-shank of the hook to pass over the intervening metal, all of which results in the hook swinging in closer to the body when the bait is drawn through the water. This method of hook attaching or hook supporting may obviously be employed advantageously with various body constructions.

In order that the bait may still further imitate a living fish, I prefer to provide the blades, usually all except the heavier or larger at the bottom, with an eye. In some instances, this eye consists merely of a hole in the blade, as at 30, in Figs. 4, 5 and 6. In still others, I insert a plug, preferably metal, as at 31, Figs. 8, 9 and 10, and which, if desired, may have a hole through the center as indicated at 32, Fig. 20. To augment the effect, I prefer to spin up the edges of the metal surrounding the hole, as at 33, Figs. 11, 12 and 13, which may be used without the plug but is better with the either solid or open plug as at 34 in Figs. 14, 15, and 16, and when so used provides a better permanent seat for the plug. When the bait is of light color as of nickel or silver plating, I prefer the bushing or plug to be of another color, preferably yellow, and when the blades are of a gold or other color, a bushing of light or silver is preferable, the object being to create a contrast which gives a nearly perfect imitation of an eye. The lure of Figs. 17 and 18 is provided with eyes 35. It will be further observed that each hole represents two eyes, that is, one on each side of the blade.

Another feature of the present invention is that the same may be readily converted into a so-called weedless hook, that is, a hook which does not catch upon the weeds as it is drawn through the water. It is a fact well known that game fish seek waters where weeds abound to such an extent that no hooks can be drawn through unless the points are guarded by springs or other means, which practically destroys their fish catching qualities while at the same time not wholly preventing the hooking of weeds. In my invention the device may be changed to a strictly weedless bait, while at the same time the fish are hooked with reasonable certainty. This is accomplished as indicated in dotted lines in Fig. 2 and in full lines in Fig. 7, by swinging the hooks forwardly and wedging them astride the blades, thus holding the hooks generally as indicated in these figures with their points pointing backward so that they can catch no weeds or other foreign matter while for the strike of the fish they are still in an advantageous position. This result may be accomplished in any of the forms shown in the drawing with the side hooks, and with the rear hooks as well where the rear spinner is not used, as in Figs. 4 to 7. It will be understood that many fish bite from the side, and that the points of the hooks do not lie against the faces of the blades when they are swung forward as shown but on the contrary project out into space where they will hook the fish attacking at the side. The hook may then pull off from astride the blade and swing around into the first position. Still other advantages of this capability of the hooks to be folded forwardly are that when so folded the bait is more conveniently carried in a tackle box, or box for shipment and they can be carried in the pocket without so much danger of hooking into the clothing and can be handled generally with greater convenience.

While I have thus specifically illustrated various forms of my invention, I have attempted to make it clear and here repeat that the invention is not to be limited to the specific forms and details of construction so described, but that it may be embodied in various forms and includes all such changes and modifications as fairly fall within its scope and principle.

Having thus described my invention, what I claim as new and desire to secure by Letters Patent, is:

1. In a fish bait or lure, a body consisting of a plurality of elongated blades lying in intersecting planes.

2. In a non-spinning fish bait or lure, a body consisting of a multiplicity of blades at angles to each other.

3. In a fish bait or lure, a relatively long and narrow body consisting of a plurality of longitudinal radially disposed blades.

4. In a fish bait or lure, a body having a multiplicity of longitudinal radially disposed blades, one of which is made heavier than the others for maintaining the body upright in the water.

5. In a fish bait or lure, a body having a plurality of blades at angles to each other, and which vary from each other in their respective weights.

6. In a fish bait or lure, a body having a multiplicity of longitudinal radially disposed blades varying in their respective weights to prevent the said body from revolving or turning over when drawn through the water.

7. In a non-spinning fish bait or lure, a body comprising a plurality of longitudinal radially disposed blades having the outline of a fish.

8. In a fish bait or lure, a body comprising a plurality of blades with their surfaces at angles to each other, and a hook secured to at least one of said blades.

9. In a fish bait or lure, a body comprising a number of longitudinal radially disposed blades, and hooks secured to a plurality of said blades.

10. A non-spinning fish bait or lure, the body of which has longitudinally disposed blades, one or more of which has a hole adjacent the outer edge of the blade for attaching the hook.

11. In a fish bait or lure, a body comprising a plurality of elongated radially disposed blades, one or more hooks hingedly secured to said body, the body and hook coöperating to hold the point or points of the hook out away from the body when the bait or lure is drawn through the water.

12. In a fish bait or lure, a blade a hook carried thereby, said blade having an opening therein to receive the eye of the hook, said opening being of sufficient size to permit the passage therethrough of the barb of the hook and located near the outer edge of the blade and having a portion at a distance from said edge to receive the eye of the hook when the bait or lure is drawn through the water.

13. In a fish bait or lure, a blade having a wholly exposed slot therein of sufficient length to accommodate the barb of the hook in passing through it, the slot having a part extending near the outer edge of the blade to facilitate inserting the hook.

14. In a fish bait or lure, a blade having a closed slot therein extending at an angle to the outer edge of the blade, and a hook the eye of which passes through said slot.

15. In a fish bait or lure, a blade having a closed slot therein extending at an angle to the outer edge of said blade with its forward end near the said edge, and an open shank hook secured in said slot.

16. In a fish bait or lure, a body consisting of a plurality of elongated blades lying in intersecting planes, one or more of said blades having a hole therein corresponding to the position of the eye.

17. In a fish bait or lure, a blade having a hole therein corresponding to the position of the eye with a bushing in said hole of a varying color from that of the blade to represent the eye.

18. In a fish bait or lure, a blade having a hole therein with elevated edges corresponding to the position of the eye.

19. In a fish bait or lure, a blade having a hole therein with elevated edges corresponding to the position of the eye, and a plug or bushing in said hole.

20. In a fish bait or lure, a body having a longitudinal blade, and an open shank hook attached to said blade and capable of being swung forwardly with its shank astride the blade.

21. In a fish bait or lure, a body, and hooks attached thereto and capable of being swung forwardly with their points pointing backward and held in that position by engagement with the body.

22. In a fish bait or lure, a body, and hooks attached thereto for use in the ordinary manner, said hooks being capable of ready reversal with respect to the body to convert the device into a weedless bait or lure.

23. In a fish bait or lure, a body consisting of a plurality of longitudinal radially disposed blades, and open shank hooks carried by some or all of said blades and adapted to be swung forwardly astride the blades and to remain in that position while being drawn through the water.

24. In a fish bait or lure, a body consisting of a plurality of elongated blades lying in intersecting planes, one or more of said blades having a hole therein corresponding to the position of the eye, with a member in said hole of a color differing from that of the blade.

25. In a fish bait or lure, a blade forming a permanent nondetachable part of the body of the bait or lure, said blade having a slot therein of sufficient length to accommodate the barb of the hook in passing through it, the said slot extending near the outer edge of the blade to facilitate attaching and detaching the hook.

26. In a fish bait or lure, a body having a blade-like support for a hook, said support having an aperture therein to receive the eye or ring of the hook, said aperture being located at a distance from the outer edge of said support so that the said support coöperates in holding the point or points of the hook out away from the body.

27. In a fish bait or lure, a body having a blade-like support for a hook, an open shank hook carried by said support, said support having an aperture therein of sufficient size to accommodate the barb of the hook in passing through it, one portion of said aperture being extended near the edge of said support to facilitate attaching and detaching the hook and another portion at a distance from the edge of the support to receive the eye or ring of the hook after its attachment, the edge of said support coöperating in holding the point or points of the hook out away from the body.

In witness whereof, I have hereunto subscribed my name in the presence of two witnesses.

JAMES HEDDON.

Witnesses:
   J. R. EDWARDS,
   JESSE REED.